US011825459B2

(12) United States Patent
Zhu et al.

(10) Patent No.: US 11,825,459 B2
(45) Date of Patent: Nov. 21, 2023

(54) MODE-BASED BEAM MANAGEMENT FOR A USER EQUIPMENT DEVICE

(71) Applicant: QUALCOMM Incorporated, San Diego, CA (US)

(72) Inventors: Jun Zhu, San Diego, CA (US); Yong Li, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 17/242,134

(22) Filed: Apr. 27, 2021

(65) Prior Publication Data

US 2022/0346077 A1    Oct. 27, 2022

(51) Int. Cl.
  *H04W 76/28* (2018.01)
  *H04W 72/044* (2023.01)
  *H04W 56/00* (2009.01)
  *H04J 11/00* (2006.01)

(52) U.S. Cl.
  CPC ....... *H04W 72/046* (2013.01); *H04W 56/001* (2013.01); *H04W 76/28* (2018.02); *H04J 11/0073* (2013.01); *H04J 11/0076* (2013.01); *H04J 2211/005* (2013.01)

(58) Field of Classification Search
  CPC . H04W 56/001; H04W 72/046; H04W 76/28; H04W 8/20; H04W 24/10; H04W 68/005; H04B 7/0695; H04B 7/088
  See application file for complete search history.

(56) References Cited

U.S. PATENT DOCUMENTS

| 2019/0289552 | A1  | 9/2019  | Jain et al. | |
|---|---|---|---|---|
| 2020/0413276 | A1  | 12/2020 | Zhu et al. | |
| 2021/0007072 | A1  | 1/2021  | Wu et al. | |
| 2021/0068193 | A1* | 3/2021  | Kong | H04W 52/0229 |
| 2022/0236366 | A1* | 7/2022  | Cha | G01S 5/0236 |
| 2022/0279427 | A1* | 9/2022  | Hwang | H04W 48/16 |

OTHER PUBLICATIONS

International Search Report and Written Opinion—PCT/US2022/071802—ISA/EPO—dated Jul. 20, 2022.

* cited by examiner

*Primary Examiner* — Anez C Ebrahim
(74) *Attorney, Agent, or Firm* — Norton Rose Fulbright US LLP (57) ABSTRACT

A method of wireless communication includes receiving, by a UE, one or more configuration messages indicating synchronization signals (SS) and physical broadcast channel (PBCH) block measurement timing configuration (SMTC) parameters. The SMTC parameters indicate SMTC windows associated with reception of synchronization signal blocks (SSBs) by the UE from a base station. The method further includes, based on detecting one or more trigger conditions, transitioning, by the UE, from an inactive state to an active state to receive, during a time interval distinct from the SMTC windows, one or more SSBs from the base station. The method further includes performing, by the UE, one or more beam management operations based on the one or more SSBs received during the time interval.

30 Claims, 6 Drawing Sheets

MODE-BASED BEAM MANAGEMENT FOR A USER EQUIPMENT DEVICE

TECHNICAL FIELD

Aspects of the present disclosure relate generally to wireless communication systems, and more particularly, to wireless communication systems that use beam management.

Introduction

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a method of wireless communication includes receiving, by a UE, one or more configuration messages indicating synchronization signals (SS) and physical broadcast channel (PBCH) block measurement timing configuration (SMTC) parameters. The SMTC parameters indicate SMTC windows associated with reception of synchronization signal blocks (SSBs) by the UE from a base station. The method further includes, based on detecting one or more trigger conditions, transitioning, by the UE, from a first mode to a second mode to receive, during a time interval distinct from the SMTC windows, one or more SSBs from the base station. The method further includes performing, by the UE, one or more beam management operations based on the one or more SSBs received during the time interval.

In some other aspects of the disclosure, an apparatus includes a memory and one or more processors coupled to the memory. The one or more processors are configured to receive, at a UE, one or more configuration messages indicating SMTC parameters. The SMTC parameters indicate SMTC windows associated with reception of SSBs by the UE from a base station. The one or more processors are further configured to transition, based on detection of one or more trigger conditions, from a first mode to a second mode to receive, during a time interval distinct from the SMTC windows, one or more SSBs from the base station. The one or more processors are further configured to perform, by the UE, one or more beam management operations based on the one or more SSBs received during the time interval.

In some other aspects of the disclosure, a non-transitory computer-readable medium stores instructions executable by a processor to perform operations. The operations include receiving, by a UE, one or more configuration messages indicating SMTC parameters. The SMTC parameters indicate SMTC windows associated with reception of SSBs by the UE from a base station. The operations further include, based on detecting one or more trigger conditions, transitioning, by the UE, from a first mode to a second mode to receive, during a time interval distinct from the SMTC windows, one or more SSBs from the base station. The operations further include performing, by the UE, one or more beam management operations based on the one or more SSBs received during the time interval.

In some other aspects of the disclosure, an apparatus includes means for receiving, at a UE, one or more configuration messages indicating SMTC parameters. The SMTC parameters indicate SMTC windows associated with reception of SSBs by the UE from a base station. The apparatus further includes means for transitioning, based on detection of one or more trigger conditions, from a first mode to a second mode to receive, during a time interval distinct from the SMTC windows, one or more SSBs from the base station and for performing one or more beam management operations based on the one or more SSBs received during the time interval.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Wireless communication systems may use beam management to improve efficiency of communication between devices. To illustrate, in some beam management techniques, a base station may transmit multiple beams in different directions to a user equipment (UE). The UE may receive the multiple beams, may select one of the beams, and may transmit an indication of the selected beam to the base station.

Certain wireless communication protocols use dedicated windows for transmitting and receiving beams used for beam management operations. To illustrate, some wireless communication protocols use synchronization signals (SS) and physical broadcast channel (PBCH) block measurement timing configuration (SMTC) windows for transmitting and receiving beams used for beam management operations. In some cases, the SMTC windows may occur relatively infrequently, reducing effectiveness of beam management. For example, if the SMTC windows occur relatively infrequently, and if the UE experiences a large amount of rotation (such as while executing an extended reality (XR) application) or movement (e.g., while inside a vehicle), then the UE may be unable to effectively track beams of the base station. Further, increasing the frequency of the SMTC windows may reduce an amount of wireless resources available for data and other messages, which may increase latency in the wireless communication system and which may be infeasible in some systems.

A UE in accordance with some aspects of the disclosure may select a non-SMTC window to perform beam management based on a determination that the non-SMTC window occurs during a particular mode of operation of the UE. The particular mode of operation of the UE may correspond to a connected mode discontinuous data reception (CDRX)-OFF cycle of the UE. For example, the non-SMTC window may occur prior to a CDRX-ON cycle, and the UE may "wake early" from the CDRX-OFF cycle to perform beam management operations, such as by sweeping beams received from a base station. During the CDRX-OFF cycle, the base station may avoiding scheduling downlink transmissions to the UE. As a result, the UE may avoid monitoring for downlink signals from the base station during the non-SMTC window, enabling the UE to perform beam management during the non-SMTC window. Thus, the UE may increase a number or frequency of beam management operations, improving beam tracking and performance.

The UE may select the non-SMTC window based on detecting one or more trigger conditions. In some examples, the one or more trigger conditions include a frequency (or periodicity) of SMTC windows. For example, for less frequently occurring SMTC windows, the UE may monitor for beams outside of the SMTC windows (such as during the non-SMTC window). Alternatively or in addition, the one or more trigger conditions may include timing of a CDRX cycle of the UE. To illustrate, if the SMTC windows occur relatively far from a CDRX-ON cycle, or if the non-SMTC window occurs relatively near to a CDRX-ON cycle, then the UE may monitor for beams during the non-SMTC window. As a result, frequency of beam management operations may be increased (e.g., by performing beam management during both SMTC windows and during one or more non-SMTC windows as compared to performing beam management during only SMTC windows), improving beam tracking and performance in some cases. For example, by improving beam tracking, power overhead of the UE may be reduced (resulting in power gain of the UE and reducing battery usage of the UE) as compared to some other techniques. As another example, improved beam tracking may result in an increased signal-to-noise ratio (SNR) of the UE as compared to certain other techniques.

To further illustrate, some aspects of the disclosure relate to wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements, integrated circuits, and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

Figure 1:
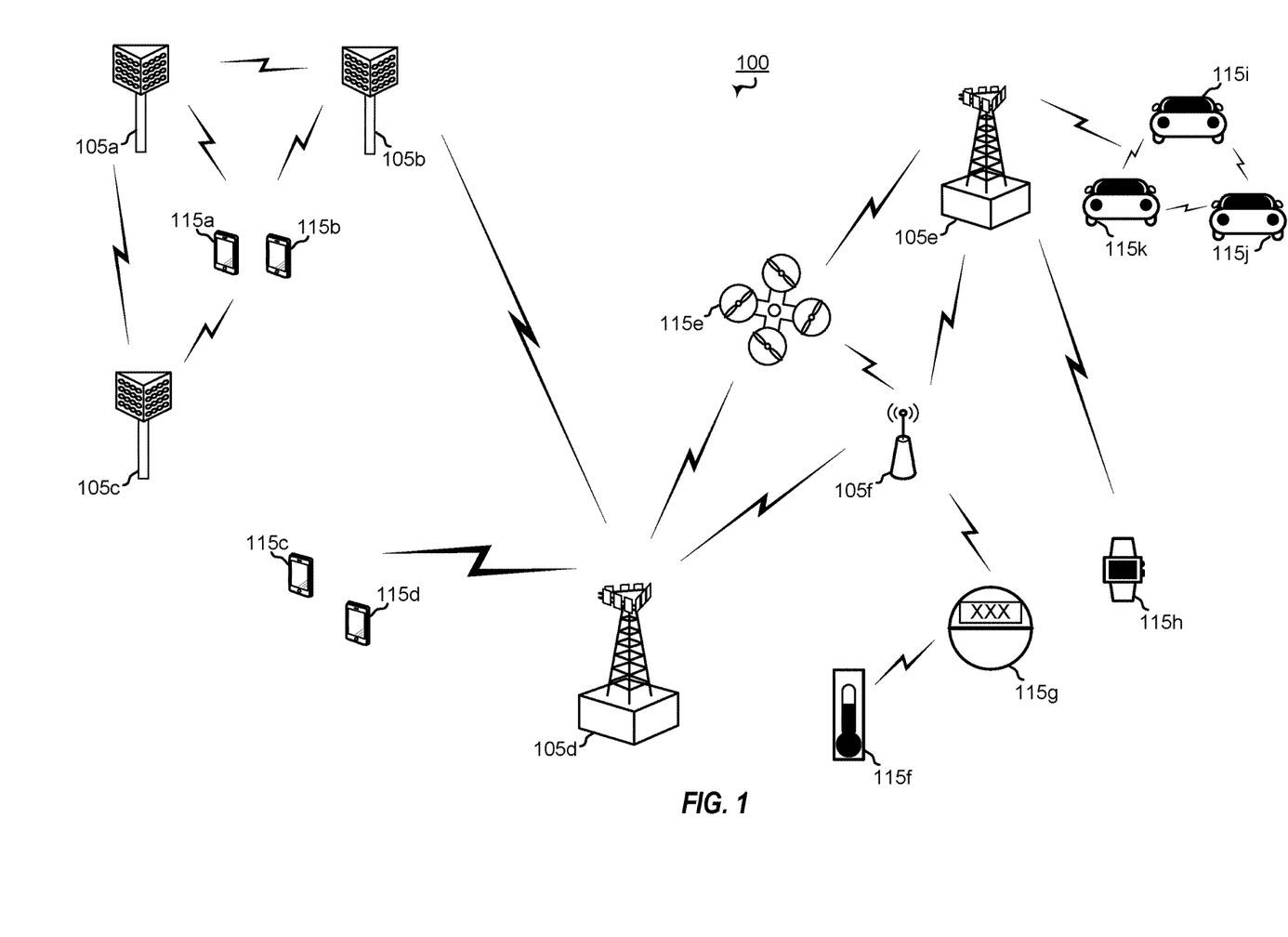
FIG. 1 is a block diagram illustrating an example of a wireless communication system according to some aspects of the disclosure.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multi-point (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
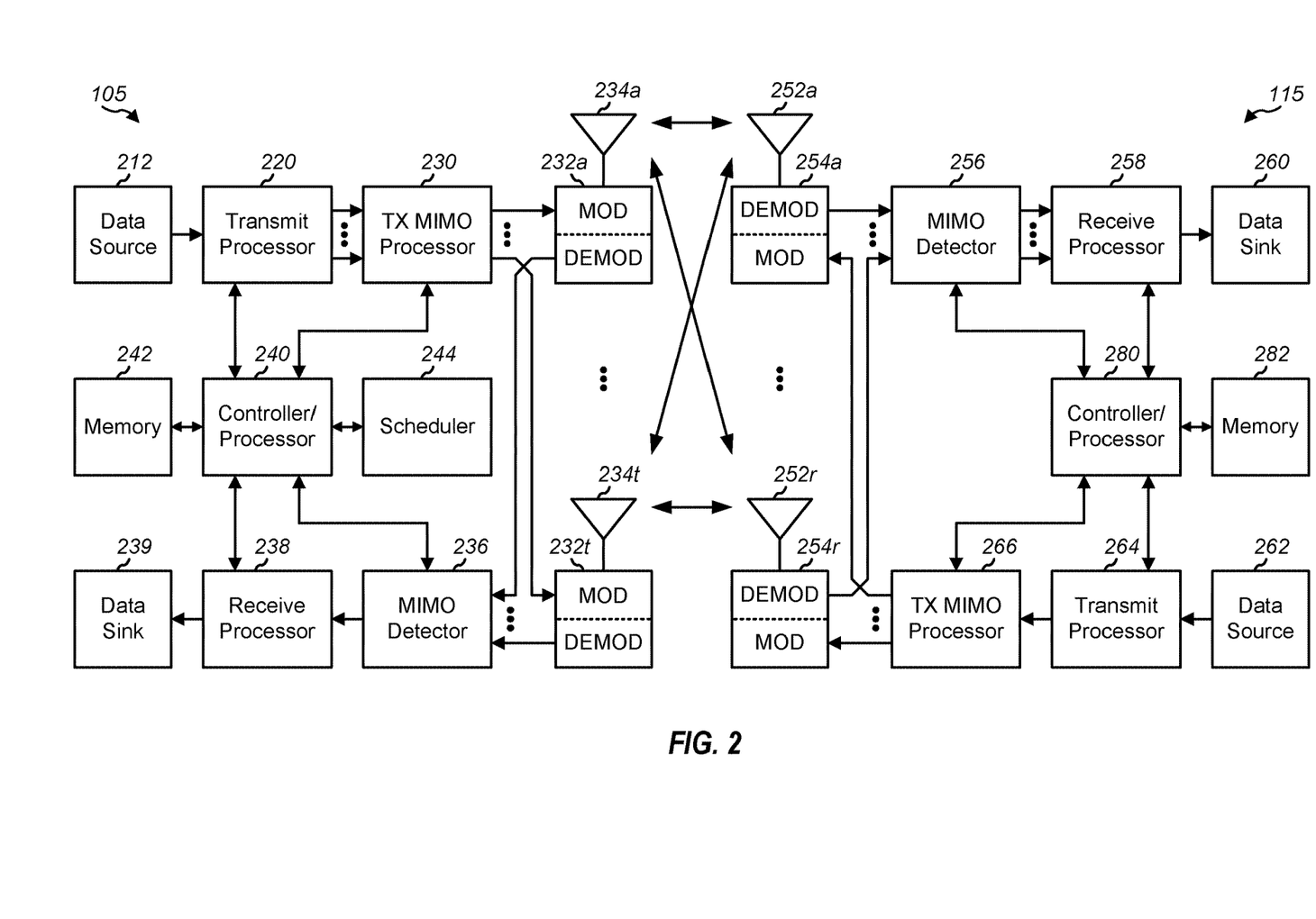
FIG. 2 is a block diagram illustrating examples of a base station and a UE configured according to some aspects of the disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, the antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIG. 5, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
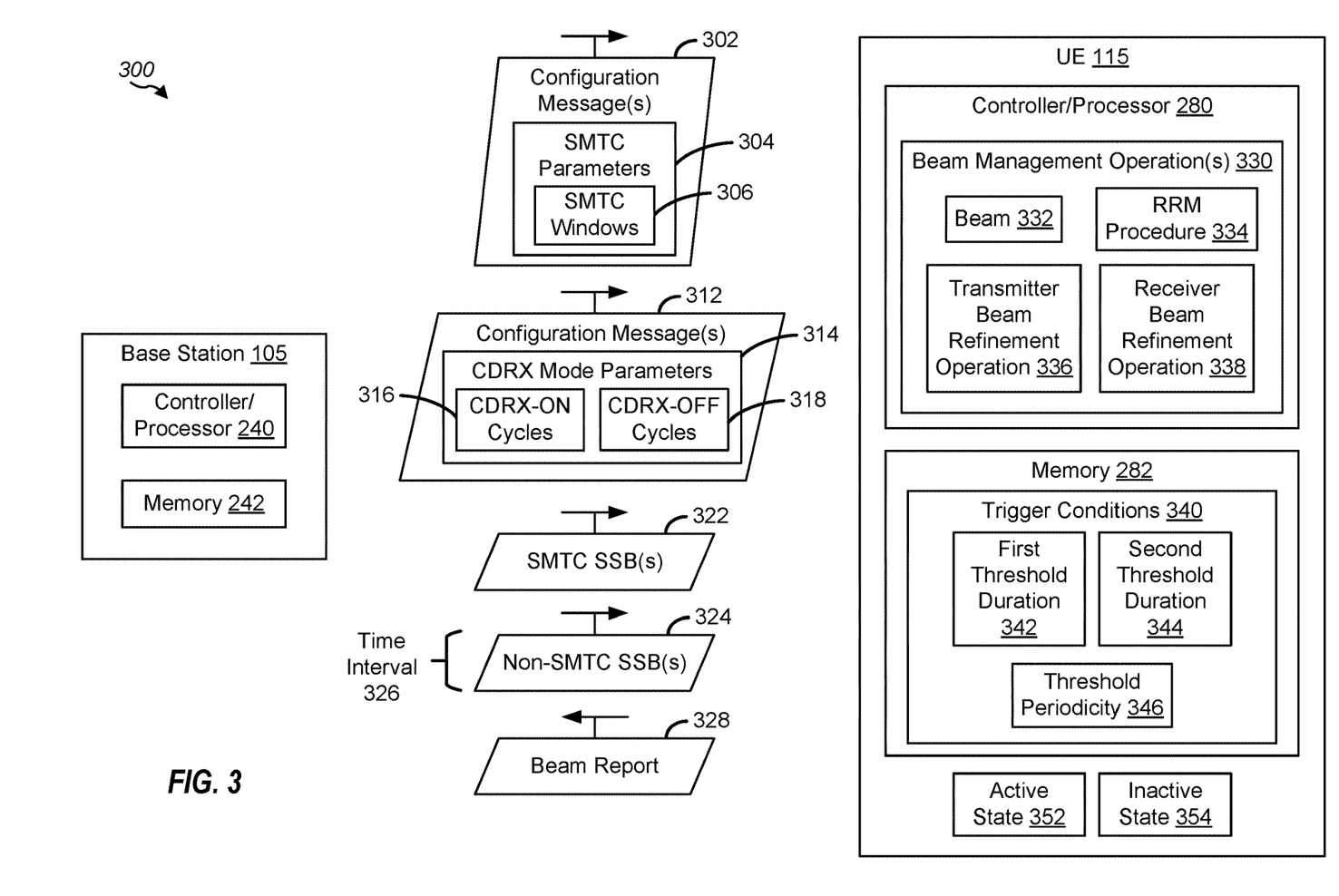
FIG. 3 is a block diagram illustrating another example of a wireless communication system according to some aspects of the disclosure.

FIG. 3 is a block diagram illustrating another example of a wireless communication system 300 according to some aspects of the disclosure. The wireless communication system 300 may include one or more base stations, such as the base station 105, and may include one or more UEs, such as the UE 115. The base station 105 may correspond to a serving cell of the UE 115.

FIG. 3 illustrates that the base station 105 may include one or more processors (e.g., the controller/processor 240) and one or more memories, such as the memory 242. The UE 115 may include one or more processors (such as the controller/processor 280) and one or more memories (e.g., the memory 282).

During operation, the UE 115 may communicate with the base station 105. The base station 105 may transmit one or more configuration messages to the UE 115 indicating certain parameters. For example, the base station 105 may transmit one or more configuration messages 302 indicating synchronization signals (SS) and physical broadcast channel (PBCH) block measurement timing configuration (SMTC) parameters 304. The SMTC parameters 304 may indicate SMTC windows 306 associated with reception of synchronization signal blocks (SSBs) by the UE 115 from a base station, such as the base station 105.

As another example, the base station 105 may transmit one or more configuration messages 312 indicating connected mode discontinuous data reception (CDRX) mode parameters 314. The CDRX mode parameters 314 may be associated with CDRX-ON cycles 316 and CDRX-OFF cycles 318. For example, the CDRX mode parameters 314 may indicate a schedule of the CDRX-ON cycles 316 and the CDRX-OFF cycles 318. During the CDRX-ON cycles 316, the UE 115 may operate according to an active state 352 to monitor for signals from the base station 105, to transmit signals to the base station 105, or both.

During the CDRX-OFF cycles 318, the UE 115 may optionally operate according to an inactive state 354 (since for example no signals may be transmitted by the base station 105 to the UE 115 during the CDRX-OFF cycles 318). The inactive state 354 may correspond to a sleep state during which the UE 115 consumes less power as compared to operation based on the active state 352. For example, during the inactive state 354, the UE 115 may operate one or more radio devices of the UE 115 according to a low-power or sleep mode to reduce power consumption.

During the SMTC windows 306, the UE 115 may monitor for one or more signals, such as SMTC SSBs 322 transmitted by the base station 105. The one or more SMTC SSBs 322 may include directional signals (e.g., beams) transmitted by the base station 105. The base station 105 may transmit the one or more SMTC SSBs 322 using multiple antennas or antenna arrays (e.g., any of the antennas 234a-t of FIG. 2), and the UE 115 may receive the one or more SMTC SSBs 322 using multiple antennas or antenna arrays (e.g., any of the antennas 252a-r of FIG. 2). In some circumstances, the one or more SMTC SSBs 322 may include one or more SSBs from neighboring cells of the base station 105 that have SMTC windows that overlap (or partially overlap) the SMTC windows 306. The UE 115 may monitor for signals during the SMTC windows 306 to facilitate beam management, measurement reporting, handover requests, other operations, or a combination thereof. In some cases, a particular SMTC window 306 may occur during (or may overlap with) the CDRX-OFF cycles 318. In this case, the UE 115 transition from the inactive state 354 to the active state 352 to monitor for signals during the particular SMTC window 306.

In some circumstances, transitioning from the inactive state 354 to the active state 352 to monitor for signals during an SMTC window 306 may consume a relatively large amount of power by the UE 115. For example, if the SMTC window 306 occurs during the middle of a CDRX-OFF cycle 318, then the UE 115 may transition from the inactive state 354 to the active state 352 to monitor for signals and then may transition from the active state 352 to the inactive state 354, consuming power and reducing effectiveness of CDRX operation.

Further, in some circumstances, the SMTC windows 306 may occur relatively infrequently for some operations, which may result in inefficiency. To illustrate, the UE 115 may perform beam management during the SMTC windows 306. If the SMTC windows 306 occur relatively infrequently, and if the UE 115 is experiencing a large amount of rotation (such as while executing an extended reality (XR) application) or movement (e.g., while inside a vehicle), then the UE 115 may be unable to accurately track beams of the base station 105.

In some aspects of the disclosure, the UE 115 may select a time interval 326 (e.g., a non-SMTC time interval) that is distinct from the SMTC windows 306 to perform one or more beam management operations 330. In some examples, the UE 115 selects the time interval 326 based on a determination that the time interval 326 occurs during a CDRX-OFF cycle 318. During the CDRX-OFF cycles 318, the base station 105 may avoiding scheduling downlink transmissions to the UE 115. As a result, the UE 115 may avoid monitoring for downlink signals from the base station 105 during the time interval 326, enabling the UE 115 to perform the one or more beam management operations 330 during the time interval 326. Thus, the UE 115 may increase a number or frequency of the one or more beam management operations 330, improving beam tracking and performance.

To further illustrate, the UE 115 may transition from the inactive state 354 to the active state 352 to monitor for SSBs during or prior to the time interval 326. For example, the UE 115 may receive one or more non-SMTC SSBs 324 from base station 105 during the time interval 326. The one or more non-SMTC SSBs 324 may include directional signals (e.g., beams) transmitted by the base station 105. The base station 105 may transmit the one or more non-SMTC SSBs 324 using multiple antennas or antenna arrays (e.g., any of the antennas 234a-t of FIG. 2), and the UE 115 may receive the one or more non-SMTC SSBs 324 using multiple antennas or antenna arrays (e.g., any of the antennas 252a-r of FIG. 2).

The UE 115 may perform the one or more beam management operations 330 based on the one or more non-SMTC SSBs 324 received during the time interval 326. In some examples, performing the one or more beam management operations 330 includes one or more of selecting a beam 332 based on the one or more non-SMTC SSBs 324, performing a radio resource management (RRM) procedure 334 based on the one or more non-SMTC SSBs 324, performing a transmitter beam refinement operation 336 based on the one or more non-SMTC SSBs 324, or performing a receiver beam refinement operation 338 based on the one or more non-SMTC SSBs 324.

In some examples, the UE 115 may generate the beam report 328 based on the one or more non-SMTC SSBs 324 received during the time interval 326. To illustrate, the beam report 328 may indicate the beam 332 selected based on the one or more non-SMTC SSBs 324. Alternatively or in addition, the beam report 328 may indicate other information, such as a result of the transmitter beam refinement operation 336. The UE 115 may transmit the beam report 328 to the base station 105.

In some implementations, the UE 115 monitors for one or more trigger conditions 340. Based on detecting the one or more trigger conditions 340, the UE 115 may transition from the inactive state 354 to the active state 352 to monitor for the one or more non-SMTC SSBs 324 during the time interval 326. In some other examples, in response to failing to detect the one or more trigger conditions 340, the UE 115 may avoid monitoring for the one or more non-SMTC SSBs 324 during the time interval 326. For example, the UE 115 may remain in the inactive state 354 during the time interval 326 (instead of transitioning to the active state 352 to monitor for the one or more non-SMTC SSBs 324). In some examples, the trigger conditions 340 indicate or correspond to a first threshold duration 342, a second threshold duration 344, a threshold periodicity 346, one or more other parameters, or a combination thereof, as described further with reference to FIG. 4.

Figure 4:
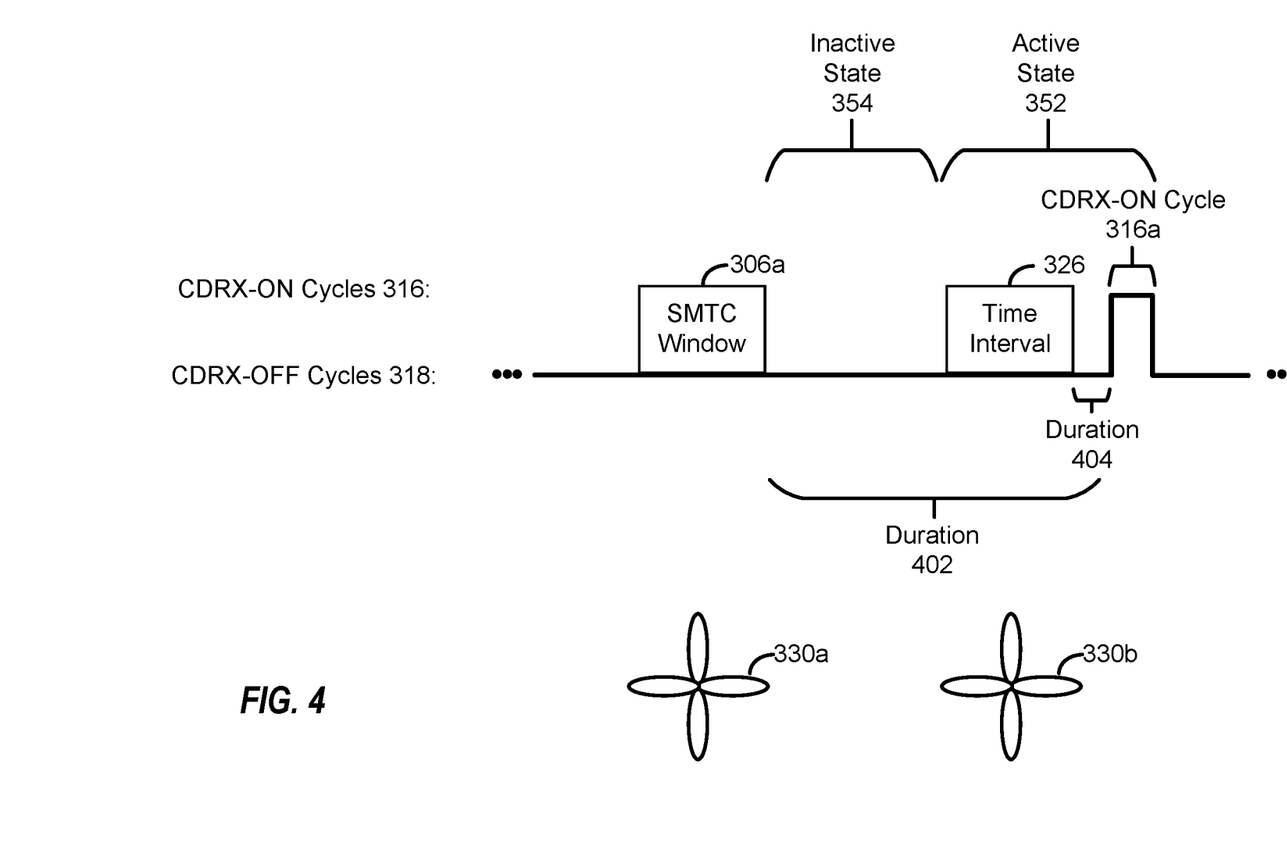
FIG. 4 is a timing diagram illustrating certain examples according to some aspects of the disclosure.

FIG. 4 is a timing diagram illustrating certain examples according to some aspects of the disclosure. In FIG. 4, time may advance from left to right (e.g., where the abscissa indicates time). In FIG. 4, the ordinate may indicate a state of the UE 115, such as where the lower value of the ordinate indicates the CDRX-OFF cycles 318 and where the upper value of the ordinate indicates the CDRX-ON cycles 316.

FIG. 4 depicts that the SMTC windows 306 may include an SMTC window 306a. In the example of FIG. 4, the SMTC window 306a may occur during a CDRX-OFF cycle 318. In this case, the UE 115 may transition from the inactive state 354 to the active state 352 during the SMTC window 306a (to receive the one or more SMTC SSBs 322 of FIG. 3) and may transition from the active state 352 to the inactive state 354 after the SMTC window 306a, which may increase power consumption of the UE 115.

In some examples, the one or more trigger conditions 340 of FIG. 3 are based on a duration 402 between the SMTC window and a CDRX-ON cycle 316a. For example, the one or more trigger conditions 340 may include detecting that the SMTC window 306a occurs during a CDRX-OFF cycle 318 and that the duration 402 exceeds the first threshold duration 342. In some cases, waking during the CDRX-OFF cycle 318 to perform beam management may consume power by the UE 115. In some cases, performing beam management during the time interval 326 (alternatively or in addition to performing beam management during the SMTC window 306a) may improve accuracy of beam management by the UE 115, such as by enabling more frequency beam management operations by the UE 115, by reducing a number of wake/sleep cycles of the UE 115, or both.

FIG. 4 also depicts that the UE 115 may operate according to the active state 352 for the time interval 326. To illustrate, the CDRX mode parameters 314 may specify a CDRX cycle during which the UE 115 may operate according the inactive state 354 after the SMTC window 306a, during the time interval 326, and until the CDRX-ON cycle 316a. In some aspects of the disclosure, the UE 115 may transition (e.g., independently of the CDRX cycle) from the inactive state 354 to the active state 352 to receive the one or more non-SMTC SSBs 324.

In some examples, the UE 115 remains in the active state 352 after time interval 326 through the CDRX-ON cycle 316. For example, instead of transitioning to the inactive state 354 for a duration 404 between the time interval 326 and the CDRX-ON cycle 316a, the UE 115 may remain in the active state 352 for the duration 404. In some examples, remaining in the active state 352 for the duration 404 reduces power consumption by the UE 115 as compared to transitioning from the active state to the inactive state 354 at the start of the duration 404 and transitioning from the inactive state 354 to the active state 352 at the end of the duration 404.

In some examples, the one or more trigger conditions 340 of FIG. 3 are based on the duration 404 between the time interval 326 and the CDRX-ON cycle 316a. For example, the one or more trigger conditions 340 may include detecting that the duration 404 is less than the second threshold duration 344. In this example, the UE 115 may determine to operate based on the active state 352 during the time interval 326 in response to detecting that the time interval 326 is relatively near the CDRX-ON cycle 316a.

In some examples, the one or more trigger conditions 340 of FIG. 3 are based on a periodicity of the SMTC windows 306. For example, less frequently occurring SMTC windows 306a (or SMTC windows 306a that are too "sparse") may be associated with poor beam tracking by the UE 115. In this case, the UE 115 may perform beam management during the time interval 326 based on the one or more non-SMTC SSBs 324 to improve accuracy of beam tracking. Accordingly, in some examples, the one or more trigger conditions 340 may include detecting that a periodicity associated with the SMTC windows 306 exceeds the threshold periodicity 346. The periodicity associated with the SMTC windows 306 may correspond to a duration between the SMTC window 306a and a subsequent SMTC window 306.

FIG. 4 also illustrates that the UE 115 may perform a beam management operation 330a during the SMTC window 306a (e.g., based on the one or more SMTC SSBs 322) and may perform a beam management operation 330b during the time interval 326 (e.g., based on the one or more non-SMTC SSBs 324). In some examples, the UE 115 generates the beam report 328 based on the beam management operations 330a-b.

One or more aspects described herein may improve performance of a wireless communication system. To illustrate, for less frequently occurring SMTC windows 306, the UE 115 may monitor for beams outside of the SMTC windows 306. Alternatively or in addition, if the SMTC windows 306 occur relatively far from a CDRX-ON cycle 316, or if the time interval 326 occurs relatively near to a CDRX-ON cycle 316, then the UE 115 may monitor for beams during the time interval 326. As a result, frequency of beam management operations 330 may be increased, improving beam tracking and performance in some cases. For example, by improving beam tracking, power overhead of the UE 115 may be reduced (resulting in power gain of the UE 115 and reducing battery usage of the UE 115) as compared to some other techniques. As another example, improved beam tracking may result in an increased signal-to-noise ratio (SNR) of the UE 115 as compared to certain other techniques.

Figure 5:
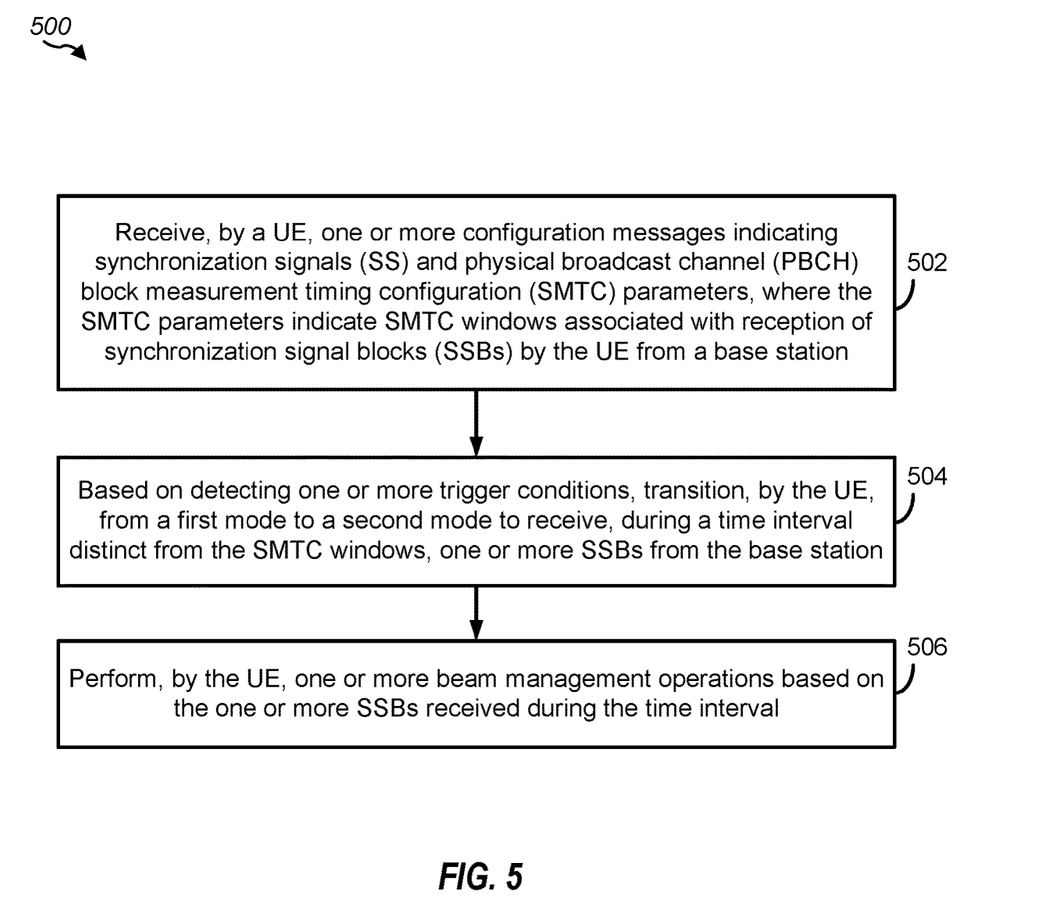
FIG. 5 is a flow chart of a method of wireless communication that may be performed by a UE according to some aspects of the disclosure.

FIG. 5 is a flow chart of an example of a method 500 of wireless communication that may be performed by a UE. In some examples, the method 500 is performed by the UE 115.

The method 500 includes receiving, by a UE, one or more configuration messages indicating SMTC parameters, at 502. The SMTC parameters indicate SMTC windows associated with reception of SSBs by the UE from a base station. For example, the UE 115 may receive the one or more configuration messages 302 from the base station 105, and the one or more configuration messages 302 may indicate the SMTC parameters 304 associated with the SMTC windows 306. The SMTC windows 306 may be associated with reception of the one or more SMTC SSBs 322 by the UE 115 from the base station 105.

The method 500 further includes, based on detecting one or more trigger conditions, transitioning, by the UE, from a first mode to a second mode to receive, during a time interval distinct from the SMTC windows, one or more SSBs from the base station, at 504. For example, the UE 115 may detect the one or more trigger conditions 340 and may transition from the inactive state 354 to the active state 352 to receive the one or more non-SMTC SSBs 324 from the base station 105 during the time interval 326.

The method 500 further includes performing, by the UE, one or more beam management operations based on the one or more SSBs received during the time interval, at 506. For example, the UE 115 may perform the one or more beam management operations 330 based on the one or more non-SMTC SSBs 324 received from the base station 105 during the time interval 326.

Figure 6:
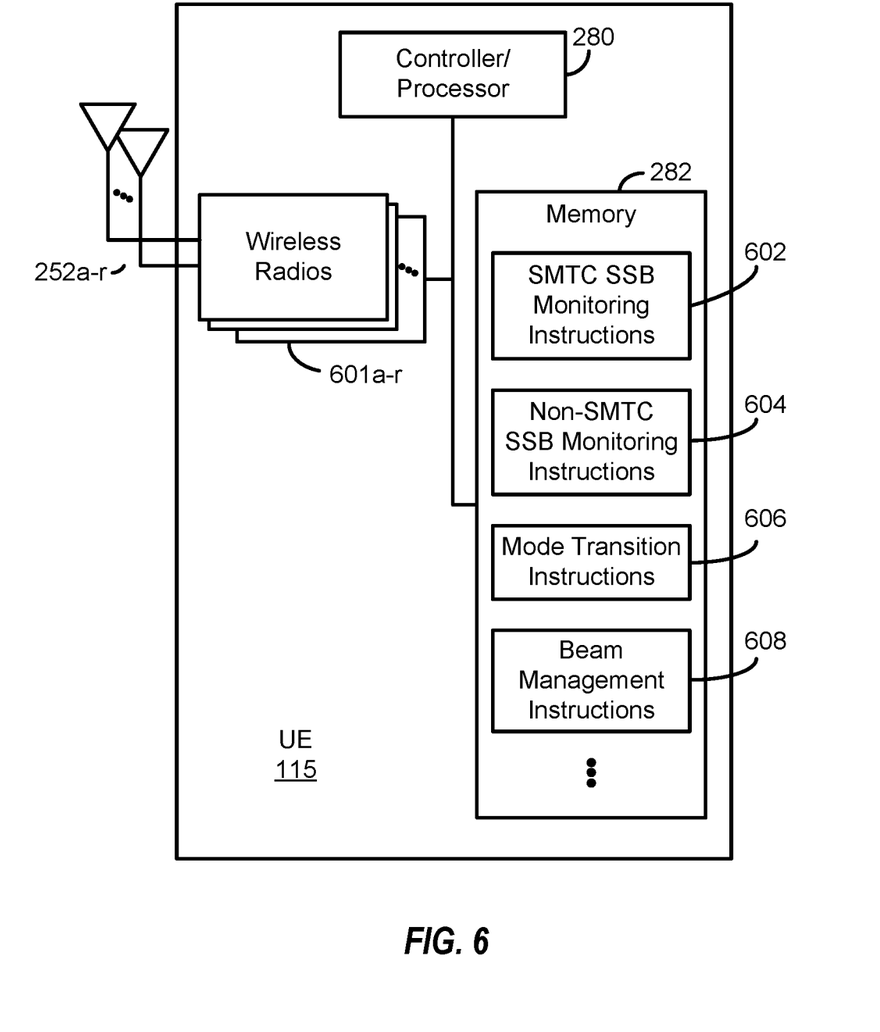
FIG. 6 is a block diagram illustrating an example of a UE according to some aspects of the disclosure.

FIG. 6 is a block diagram illustrating an example of a UE 115 according to some aspects of the disclosure. The UE 115 may include any of the structure, hardware, or components illustrated in FIG. 2. For example, the UE 115 may include the controller/processor 280, which may execute instructions stored in the memory 282. Using the controller/processor 280, the UE 115 may transmit and receive signals via wireless radios 601a-r and antennas 252a-r. The wireless radios 601a-r may include one or more components or devices described herein, such as one or more of the modulator/demodulators 254a-r, the MIMO detector 256, the receive processor 258, the transmit processor 264, the TX MIMO processor 266, one or more other components or devices, or a combination thereof.

In some examples, the controller/processor 280 executes SMTC SSB monitoring instructions 602 to monitor for and receive one or more SSBs during the SMTC windows 306, such as the one or more SMTC SSBs 322. The controller/processor 280 may also execute non-SMTC SSB monitoring instructions 604 to monitor for and receive one or more SSBs during one or more time intervals outside of the SMTC windows 306, such as by receiving the one or more non-SMTC SSBs 324 during the time interval 326. FIG. 6 also illustrates that the controller/processor 280 may execute mode transition instructions 606 to transition from the active state 352 to the inactive state 354 and from the inactive state 354 to the active state 352. The controller/processor 280 may execute beam management instructions 608 to perform the one or more beam management instructions 608. The controller/processor 280 may also execute instructions to perform one or more other operations described herein. For example, the controller/processor 280 may execute instructions to initiate, perform, or control reception and transmission of wireless signals, such as the one or more configuration messages 302, the one or more configuration messages 312, the beam report 328, one or more other signals or messages, or a combination thereof.

In a first aspect, a method of wireless communication includes receiving, by a UE, one or more SMTC parameters. The SMTC parameters indicate SMTC windows associated with reception of SSBs by the UE from a base station. The method further includes, based on detecting one or more trigger conditions, transitioning, by the UE, from a first mode to a second mode to receive, during a time interval distinct from the SMTC windows, one or more SSBs from the base station. The method further includes performing, by the UE, one or more beam management operations based on the one or more SSBs received during the time interval.

In a second aspect alternatively or in addition to the first aspect, the UE is configured with a CDRX mode, the first mode is associated with a CDRX-OFF cycle of the CDRX mode, and the method further includes selecting the time interval for the one or more beam management operations based on a determination that the time interval occurs during the CDRX-OFF cycle.

In a third aspect alternatively or in addition to one or more of the first through second aspects, the method further includes remaining in the second mode for a CDRX-ON cycle of the CDRX mode occurring after the time interval.

In a fourth aspect alternatively or in addition to one or more of the first through third aspects, the one or more trigger conditions include detecting that an SMTC window of the SMTC windows occurs during a CDRX-OFF cycle of the CDRX mode and that a duration between the SMTC window and a CDRX-ON cycle of the CDRX mode exceeds a first threshold duration.

In a fifth aspect alternatively or in addition to one or more of the first through fourth aspects, the one or more trigger conditions include detecting that a duration between the time interval and a CDRX-ON cycle that is associated with the CDRX mode is less than a second threshold duration.

In a sixth aspect alternatively or in addition to one or more of the first through fifth aspects, the one or more trigger conditions include detecting that a periodicity associated with the SMTC windows exceeds a threshold periodicity.

In a seventh aspect alternatively or in addition to one or more of the first through sixth aspects, performing the one or more beam management operations includes one or more of selecting a beam based on the one or more SSBs, or performing an RRM procedure based on the one or more SSBs, performing a transmitter beam refinement operation based on the one or more SSBs, performing a receiver beam refinement operation based on the one or more SSBs.

In an eighth aspect alternatively or in addition to one or more of the first through seventh aspects, the method further includes transmitting, by the UE to the base station, a beam report based on the one or more SSBs received by the UE during the time interval, and the beam report indicates one or more of the selected beam or a result of the transmitter beam refinement operation.

In a ninth aspect alternatively or in addition to one or more of the first through eighth aspects, the method further includes receiving, by the UE, at least one other SSB from the base station during one or more of the SMTC windows.

In a tenth aspect alternatively or in addition to one or more of the first through ninth aspects, the method further includes receiving, by the UE from the base station, one or more configuration messages indicating CDRX mode parameters associated with the second mode and the first mode.

In an eleventh aspect alternatively or in addition to one or more of the first through tenth aspects, an apparatus includes a memory and one or more processors coupled to the memory. The one or more processors are configured to receive, at a UE, one or more configuration messages indicating SMTC parameters. The SMTC parameters indicate SMTC windows associated with reception of SSBs by the UE from a base station. The one or more processors are further configured to transition, based on detection of one or more trigger conditions, from a first mode to a second mode to receive, during a time interval distinct from the SMTC windows, one or more SSBs from the base station. The one or more processors are further configured to perform, by the UE, one or more beam management operations based on the one or more SSBs received during the time interval.

In a twelfth aspect alternatively or in addition to one or more of the first through eleventh aspects, the UE is configured with a CDRX mode, the first mode is associated with a CDRX-OFF cycle of CDRX mode, and the one or more processors are configured to select the time interval for the one or more beam management operations based on a determination that the time interval occurs during the CDRX-OFF cycle.

In a thirteenth aspect alternatively or in addition to one or more of the first through twelfth aspects, the one or more processors are further configured to remain in the second mode for a CDRX-ON cycle of the CDRX mode occurring after the time interval.

In a fourteenth aspect alternatively or in addition to one or more of the first through thirteenth aspects, the one or more trigger conditions include detection that an SMTC window of the SMTC windows occurs during a CDRX-OFF cycle of the CDRX mode and that a duration between the SMTC window and a CDRX-ON cycle of the CDRX mode exceeds a first threshold duration.

In a fifteenth aspect alternatively or in addition to one or more of the first through fourteenth aspects, the one or more trigger conditions include detection that a duration between the time interval and a CDRX-ON cycle that is associated with the CDRX mode is less than a second threshold duration.

In a sixteenth aspect alternatively or in addition to one or more of the first through fifteenth aspects, the one or more trigger conditions include detection that a periodicity associated with the SMTC windows exceeds a threshold periodicity.

In a seventeenth aspect alternatively or in addition to one or more of the first through sixteenth aspects, performing the one or more beam management operations includes one or more of selecting a beam based on the one or more SSBs, or performing an RRM procedure based on the one or more SSBs, performing a transmitter beam refinement operation based on the one or more SSBs, performing a receiver beam refinement operation based on the one or more SSBs.

In an eighteenth aspect alternatively or in addition to one or more of the first through seventeenth aspects, the one or more processors are further configured to transmit, from the UE to the base station, a beam report based on the one or more SSBs received by the UE during the time interval, and the beam report indicates one or more of the selected beam or a result of the transmitter beam refinement operation.

In a nineteenth aspect alternatively or in addition to one or more of the first through eighteenth aspects, the one or more processors are further configured to receive at least one other SSB from the base station during one or more of the SMTC windows.

In a twentieth aspect alternatively or in addition to one or more of the first through nineteenth aspects, the one or more processors are further configured to receive, from the base station, one or more configuration messages indicating CDRX mode parameters associated with the second mode and the first mode.

In a twenty-first aspect alternatively or in addition to one or more of the first through thirtieth aspects, a non-transitory computer-readable medium stores instructions executable by a processor to perform operations. The operations include receiving, by a UE, one or more configuration messages indicating SMTC parameters. The SMTC parameters indicate SMTC windows associated with reception of SSBs by the UE from a base station. The operations further include, based on detecting one or more trigger conditions, transitioning, by the UE, from a first mode to a second mode to receive, during a time interval distinct from the SMTC windows, one or more SSBs from the base station. The operations further include performing, by the UE, one or more beam management operations based on the one or more SSBs received during the time interval.

In a twenty-second aspect alternatively or in addition to one or more of the first through twenty-first aspects, the UE is configured with a CDRX mode, the first mode is associated with a CDRX-OFF cycle of CDRX mode, and the operations further include selecting the time interval for the one or more beam management operations based on a determination that the time interval occurs during the CDRX-OFF cycle.

In a twenty-third aspect alternatively or in addition to one or more of the first through twenty-second aspects, the operations further comprise remaining in the second mode for a CDRX-ON cycle of the CDRX mode occurring after the time interval.

In a twenty-fourth aspect alternatively or in addition to one or more of the first through twenty-third aspects, the one or more trigger conditions include detecting that an SMTC window of the SMTC windows occurs during a CDRX-OFF cycle of the CDRX mode and that a duration between the SMTC window and a CDRX-ON cycle of the CDRX mode exceeds a first threshold duration.

In a twenty-fifth aspect alternatively or in addition to one or more of the first through twenty-fourth aspects, the one or more trigger conditions include detecting that a duration between the time interval and a CDRX-ON cycle that is associated with the CDRX mode is less than a second threshold duration.

In a twenty-sixth aspect alternatively or in addition to one or more of the first through twenty-fifth aspects, the one or more trigger conditions include detecting that a periodicity associated with the SMTC windows exceeds a threshold periodicity.

In a twenty-seventh aspect alternatively or in addition to one or more of the first through twenty-sixth aspects, performing the one or more beam management operations includes one or more of selecting a beam based on the one or more SSBs, or performing an RRM procedure based on the one or more SSBs, performing a transmitter beam refinement operation based on the one or more SSBs, performing a receiver beam refinement operation based on the one or more SSBs.

In a twenty-eighth aspect alternatively or in addition to one or more of the first through twenty-seventh aspects, the operations further comprise transmitting, by the UE to the base station, a beam report based on the one or more SSBs received by the UE during the time interval, and the beam report indicates one or more of the selected beam or a result of the transmitter beam refinement operation.

In a twenty-ninth aspect alternatively or in addition to one or more of the first through twenty-eighth aspects, the operations further include receiving, by the UE, at least one other SSB from the base station during one or more of the SMTC windows.

In a thirtieth aspect alternatively or in addition to one or more of the first through twenty-ninth aspects, the operations further include receiving, by the UE from the base station, one or more configuration messages indicating CDRX mode parameters associated with the second mode and the first mode.

In a thirty-first aspect alternatively or in addition to one or more of the first through thirtieth aspects, an apparatus includes means for receiving, at a UE, one or more configuration messages indicating SMTC parameters. The SMTC parameters indicate SMTC windows associated with reception of SSBs by the UE from a base station. The apparatus further includes means for transitioning, based on detection of one or more trigger conditions, from a first mode to a second mode to receive, during a time interval distinct from the SMTC windows, one or more SSBs from the base station and for performing one or more beam management operations based on the one or more SSBs received during the time interval.

In a thirty-second aspect alternatively or in addition to one or more of the first through thirty-first aspects, the UE is configured with a CDRX mode, the first mode is associated with a CDRX-OFF cycle of CDRX mode, and the means for transitioning is configured to select the time interval for the one or more beam management operations based on a determination that the time interval occurs during the CDRX-OFF cycle In a thirty-third aspect alternatively or in addition to one or more of the first through thirty-second aspects, the means for transitioning is configured to remain in the second mode for a CDRX-ON cycle of the CDRX mode occurring after the time interval.

In a thirty-fourth aspect alternatively or in addition to one or more of the first through thirty-third aspects, the one or more trigger conditions include detection that an SMTC window of the SMTC windows occurs during a CDRX-OFF cycle of the CDRX mode and that a duration between the SMTC window and a CDRX-ON cycle of the CDRX mode exceeds a first threshold duration.

In a thirty-fifth aspect alternatively or in addition to one or more of the first through thirty-fourth aspects, the one or more trigger conditions include detection that a duration between the time interval and a CDRX-ON cycle that is associated with the CDRX mode is less than a second threshold duration.

In a thirty-sixth aspect alternatively or in addition to one or more of the first through thirty-fifth aspects, the one or more trigger conditions include detection that a periodicity associated with the SMTC windows exceeds a threshold periodicity.

In a thirty-seventh aspect alternatively or in addition to one or more of the first through thirty-sixth aspects, performing the one or more beam management operations includes one or more of selecting a beam based on the one or more SSBs, or performing an RRM procedure based on the one or more SSBs, performing a transmitter beam refinement operation based on the one or more SSBs, performing a receiver beam refinement operation based on the one or more SSBs.

In a thirty-eighth aspect alternatively or in addition to one or more of the first through thirty-seventh aspects, the apparatus further includes means for transmitting, from the UE to the base station, a beam report based on the one or more SSBs received by the UE during the time interval, and the beam report indicates one or more of the selected beam or a result of the transmitter beam refinement operation.

In a thirty-ninth aspect alternatively or in addition to one or more of the first through thirty-eighth aspects, the means for receiving is configured to receive at least one other SSB from the base station during one or more of the SMTC windows.

In a fortieth aspect alternatively or in addition to one or more of the first through thirty-ninth aspects, the means for receiving is configured to receive, from the base station, one or more configuration messages indicating CDRX mode parameters associated with the second mode and the first mode.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, blocks, and devices described herein (e.g., the components illustrated in the example of FIG. 2) may include one or more processors, electronics devices, hardware devices, electronics components, logical circuits, memories, software codes, firmware codes, etc., or any combination thereof. In addition, one or more features described herein may be implemented via processor circuitry, via executable instructions, and/or combinations thereof.

Those of skill would further appreciate that the various illustrative blocks, devices, circuits, and operations (e.g., the blocks in FIG. 5) described herein may be implemented using electronic hardware, processor-executable instructions, or combinations of both. To illustrate, various illustrative components, blocks, devices, circuits, and operations have been described above generally in terms of their functionality. Whether such functionality is implemented using hardware or processor-executable instructions depends upon the particular application and design parameters of the overall system. Skilled artisans may implement the described functionality in varying ways for each particular application, but such implementation decisions should not be interpreted as a departure from the scope of the present disclosure. Skilled artisans will also readily recognize that the order or combination of components, operations, or interactions that are described herein are examples and that such components, operations, or interactions may be combined or performed in ways other than those illustrated and described herein.

The various illustrative blocks, devices, and circuits described herein may be implemented or performed using a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor or any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable storage media may be any available media that may be accessed by a general purpose or special purpose computer. For example, computer-readable media may include RAM, ROM, EEPROM, CD-ROM or other optical disk storage, magnetic disk storage or other magnetic storage devices, or any other medium that may be used to store desired program code means in the form of instructions or data structures and that may be accessed by a general-purpose or special-purpose computer, or a general-purpose or special-purpose processor. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
receiving, by a UE, one or more configuration messages indicating synchronization signals (SS) and physical broadcast channel (PBCH) block measurement timing configuration (SMTC) parameters, wherein the SMTC parameters indicate SMTC windows associated with reception of synchronization signal blocks (SSBs) by the UE from a base station;
based on detecting one or more trigger conditions, transitioning, by the UE, from a first mode to a second mode to receive, during a time interval distinct from the SMTC windows, one or more SSBs from the base station; and
performing, by the UE, one or more beam management operations based on the one or more SSBs received during the time interval.

2. The method of claim 1, wherein the UE is configured with a connected mode discontinuous data reception (CDRX) mode, wherein the first mode is associated with a CDRX-OFF cycle of the CDRX mode, and further comprising selecting the time interval for the one or more beam management operations based on a determination that the time interval occurs during the CDRX-OFF cycle.

3. The method of claim 2, further comprising remaining in the second mode for a CDRX-ON cycle of the CDRX mode occurring after the time interval.

4. The method of claim 2, wherein the one or more trigger conditions include detecting that an SMTC window of the SMTC windows occurs during a CDRX-OFF cycle of the CDRX mode and that a duration between the SMTC window and a CDRX-ON cycle of the CDRX mode exceeds a first threshold duration.

5. The method of claim 2, wherein the one or more trigger conditions include detecting that a duration between the time interval and a CDRX-ON cycle that is associated with the CDRX mode is less than a second threshold duration.

6. The method of claim 1, wherein the one or more trigger conditions include detecting that a periodicity associated with the SMTC windows exceeds a threshold periodicity.

7. The method of claim 1, wherein performing the one or more beam management operations includes one or more of selecting a beam based on the one or more SSBs, or performing a radio resource management (RRM) procedure based on the one or more SSBs, performing a transmitter beam refinement operation based on the one or more SSBs, performing a receiver beam refinement operation based on the one or more SSBs.

8. The method of claim 7, further comprising transmitting, by the UE to the base station, a beam report based on the one or more SSBs received by the UE during the time interval, wherein the beam report indicates one or more of the selected beam or a result of the transmitter beam refinement operation.

9. The method of claim 1, further comprising receiving, by the UE, at least one other SSB from the base station during one or more of the SMTC windows.

10. The method of claim 1, further comprising receiving, by the UE from the base station, one or more configuration messages indicating connected mode discontinuous data reception (CDRX) mode parameters associated with the second mode and the first mode.

11. An apparatus comprising:
one or more memories; and
one or more processors coupled to the one or more memories, the one or more processors configured to:
receive, at a UE, one or more configuration messages indicating synchronization signals (SS) and physical broadcast channel (PBCH) block measurement timing configuration (SMTC) parameters, wherein the SMTC parameters indicate SMTC windows associated with reception of synchronization signal blocks (SSBs) by the UE from a base station;
based on detection of one or more trigger conditions, transition, by the UE, from a first mode to a second mode to receive, during a time interval distinct from the SMTC windows, one or more SSBs from the base station; and
perform, by the UE, one or more beam management operations based on the one or more SSBs received during the time interval.

12. The apparatus of claim 11, wherein the UE is configured with a connected mode discontinuous data reception (CDRX) mode, wherein the first mode is associated with a CDRX-OFF cycle of the CDRX mode, and wherein the one or more processors are further configured to select the time interval for the one or more beam management operations based on a determination that the time interval occurs during the CDRX-OFF cycle.

13. The apparatus of claim 12, wherein the one or more processors are further configured to remain in the second mode for a CDRX-ON cycle of the CDRX mode occurring after the time interval.

14. The apparatus of claim 12, wherein the one or more trigger conditions include detection that an SMTC window of the SMTC windows occurs during a CDRX-OFF cycle of the CDRX mode and that a duration between the SMTC window and a CDRX-ON cycle of the CDRX mode exceeds a first threshold duration.

15. The apparatus of claim 12, wherein the one or more trigger conditions include detection that a duration between the time interval and a CDRX-ON cycle that is associated with the CDRX mode is less than a second threshold duration.

16. The apparatus of claim 11, wherein the one or more trigger conditions include detection that a periodicity associated with the SMTC windows exceeds a threshold periodicity.

17. The apparatus of claim 11, wherein performing the one or more beam management operations includes one or more of selecting a beam based on the one or more SSBs, or performing a radio resource management (RRM) procedure based on the one or more SSBs, performing a transmitter beam refinement operation based on the one or more SSBs, performing a receiver beam refinement operation based on the one or more SSBs.

18. The apparatus of claim 17, wherein the one or more processors are further configured to transmit, from the UE to the base station, a beam report based on the one or more SSBs received by the UE during the time interval, and wherein the beam report indicates one or more of the selected beam or a result of the transmitter beam refinement operation.

19. The apparatus of claim 11, wherein the one or more processors are further configured to receive at least one other SSB from the base station during one or more of the SMTC windows.

20. The apparatus of claim 11, wherein the one or more processors are further configured to receive, from the base station, one or more configuration messages indicating connected mode discontinuous data reception (CDRX) mode parameters associated with the second mode and the first mode.

21. A non-transitory computer-readable medium storing instructions executable by a processor to perform operations, the operations comprising:
receiving, by a UE, one or more configuration messages indicating synchronization signals (SS) and physical broadcast channel (PBCH) block measurement timing configuration (SMTC) parameters, wherein the SMTC parameters indicate SMTC windows associated with reception of synchronization signal blocks (SSBs) by the UE from a base station;
based on detecting one or more trigger conditions, transitioning, by the UE, from a first mode to a second mode to receive, during a time interval distinct from the SMTC windows, one or more SSBs from the base station; and
performing, by the UE, one or more beam management operations based on the one or more SSBs received during the time interval.

22. The non-transitory computer-readable medium of claim 21, wherein the UE is configured with a connected mode discontinuous data reception (CDRX) mode, wherein the first mode is associated with a CDRX-OFF cycle of the CDRX mode, and wherein the operations further comprise selecting the time interval for the one or more beam management operations based on a determination that the time interval occurs during the CDRX-OFF cycle.

23. The non-transitory computer-readable medium of claim 22, wherein the operations further include remaining in the second mode for a CDRX-ON cycle of the CDRX mode occurring after the time interval.

24. The non-transitory computer-readable medium of claim 22, wherein the one or more trigger conditions include detecting that an SMTC window of the SMTC windows occurs during a CDRX-OFF cycle of the CDRX mode and that a duration between the SMTC window and a CDRX-ON cycle of the CDRX mode exceeds a first threshold duration.

25. The non-transitory computer-readable medium of claim 22, wherein the one or more trigger conditions include detecting that a duration between the time interval and a CDRX-ON cycle that is associated with the CDRX mode is less than a second threshold duration.

26. An apparatus comprising:
means for receiving, at a UE, one or more configuration messages indicating synchronization signals (SS) and physical broadcast channel (PBCH) block measurement timing configuration (SMTC) parameters, wherein the SMTC parameters indicate SMTC windows associated with reception of synchronization signal blocks (SSBs) by the UE from a base station; and
means for transitioning, based on detection of one or more trigger conditions, from a first mode to a second mode to receive, during a time interval distinct from the SMTC windows, one or more SSBs from the base station and for performing one or more beam management operations based on the one or more SSBs received during the time interval.

27. The apparatus of claim 26, wherein the UE is configured with a connected mode discontinuous data reception (CDRX) mode, wherein the first mode is associated with a CDRX-OFF cycle of the CDRX mode, and wherein the means for transitioning is configured to select the time interval for the one or more beam management operations based on a determination that the time interval occurs during the CDRX-OFF cycle.

28. The apparatus of claim 27, wherein the means for transitioning is configured to remain in the second mode for a CDRX-ON cycle of the CDRX mode occurring after the time interval.

29. The apparatus of claim 27, wherein the one or more trigger conditions include detection that an SMTC window of the SMTC windows occurs during a CDRX-OFF cycle of the CDRX mode and that a duration between the SMTC window and a CDRX-ON cycle of the CDRX mode exceeds a first threshold duration.

30. The apparatus of claim 27, wherein the one or more trigger conditions include detection that a duration between the time interval and a CDRX-ON cycle that is associated with the CDRX mode is less than a second threshold duration.

\* \* \* \* \*